United States Patent
Dabbous et al.

(10) Patent No.: US 9,309,391 B2
(45) Date of Patent: Apr. 12, 2016

(54) PROCESS FOR IMPROVING THE FLOW OF PROPERTIES OF POLYMER MELTS

(75) Inventors: Raphael Dabbous, Riehen (CH); Steffen Onclin, Neustadt (DE); Hartmut Romling, Schallstadt (DE)

(73) Assignee: BASF SE, Ludwigshafen (DE)

( * ) Notice: Subject to any disclaimer, the term of this patent is extended or adjusted under 35 U.S.C. 154(b) by 507 days.

(21) Appl. No.: 13/704,273

(22) PCT Filed: Jun. 28, 2011

(86) PCT No.: PCT/EP2011/060816
§ 371 (c)(1),
(2), (4) Date: Feb. 13, 2013

(87) PCT Pub. No.: WO2012/000992
PCT Pub. Date: Jan. 5, 2012

(65) Prior Publication Data
US 2013/0144011 A1    Jun. 6, 2013

Related U.S. Application Data

(60) Provisional application No. 61/359,374, filed on Jun. 29, 2010.

(30) Foreign Application Priority Data

Jun. 29, 2010   (EP) ..................... 10167639

(51) Int. Cl.
| | | |
|---|---|---|
| *C08L 87/00* | (2006.01) | |
| *C08L 71/00* | (2006.01) | |
| *C08L 53/00* | (2006.01) | |
| *C08J 3/00* | (2006.01) | |
| *C08L 23/06* | (2006.01) | |
| *B29C 47/00* | (2006.01) | |
| *C08F 2/38* | (2006.01) | |
| *C08F 4/32* | (2006.01) | |
| *C08F 293/00* | (2006.01) | |
| *C08L 23/02* | (2006.01) | |
| *C08L 23/08* | (2006.01) | |
| *C08L 33/08* | (2006.01) | |
| *B29K 105/00* | (2006.01) | |
| *B29K 105/06* | (2006.01) | |
| *C08F 226/06* | (2006.01) | |
| *C08L 83/04* | (2006.01) | |

(52) U.S. Cl.
CPC ............ *C08L 23/06* (2013.01); *B29C 47/0004* (2013.01); *B29C 47/0021* (2013.01); *C08F 2/38* (2013.01); *C08F 4/32* (2013.01); *C08F 293/005* (2013.01); *C08J 3/005* (2013.01); *C08L 23/02* (2013.01); *C08L 23/0815* (2013.01); *C08L 33/08* (2013.01); *B29K 2105/005* (2013.01); *B29K 2105/0008* (2013.01); *B29K 2105/0026* (2013.01); *B29K 2105/0032* (2013.01); *B29K 2105/0038* (2013.01); *B29K 2105/0044* (2013.01); *B29K 2105/06* (2013.01); *C08F 226/06* (2013.01); *C08J 2323/08* (2013.01); *C08J 2453/00* (2013.01); *C08L 53/00* (2013.01); *C08L 53/005* (2013.01); *C08L 71/00* (2013.01); *C08L 83/04* (2013.01); *C08L 87/005* (2013.01); *C08L 2205/03* (2013.01); *C08L 2205/06* (2013.01); *C08L 2555/40* (2013.01)

(58) Field of Classification Search
CPC ....... C08L 53/00; C08L 53/005; C08L 23/06; C08L 23/0815; C08L 23/26; C08L 33/08; C08L 33/10; C08L 87/005; C08L 71/00; C08L 83/04; C08L 2205/06; C08F 293/005; C08F 2/38
See application file for complete search history.

(56) References Cited

U.S. PATENT DOCUMENTS

| | | |
|---|---|---|
| 3,125,547 A | 3/1964 | Blatz |
| 3,222,314 A | 12/1965 | Wolinski |
| 4,013,622 A | 3/1977 | DeJuneas et al. |
| 4,540,538 A | 9/1985 | Corwin et al. |
| 5,133,898 A | 7/1992 | Fock et al. |
| 5,707,569 A | 1/1998 | Priester et al. |
| 2005/0070644 A1 | 3/2005 | Tikuisis et al. |
| 2006/0235127 A1 | 10/2006 | Moad et al. |
| 2007/0072979 A1 * | 3/2007 | Moad et al. ............ 524/445 |
| 2009/0221739 A1 | 9/2009 | Knischka et al. |
| 2012/0059102 A1 | 3/2012 | Cernohous et al. |

FOREIGN PATENT DOCUMENTS

| | | | |
|---|---|---|---|
| WO | WO 2006074969 A1 * | 7/2006 | ........... C08F 2/38 |
| WO | 2012123928 A1 | 9/2012 | |
| WO | 2012147025 A1 | 11/2012 | |

* cited by examiner

*Primary Examiner* — Irina S Zemel
*Assistant Examiner* — Jeffrey Lenihan
(74) *Attorney, Agent, or Firm* — Marshall, Gerstein & Borun LLP

(57) ABSTRACT

The present invention relates to a process for improving the flow properties of a polymer melt formed from a thermoplastic polymer, the use of particular copolymeric additives to improve the flow properties of a polymer melt formed from a thermoplastic polymer and the use of said polymeric additives as processing aids.

16 Claims, No Drawings

PROCESS FOR IMPROVING THE FLOW OF PROPERTIES OF POLYMER MELTS

The present invention relates to a process for improving the flow properties of a polymer melt formed from a thermoplastic polymer, to the use of particular copolymeric additives to improve the flow properties of a polymer melt formed from a thermoplastic polymer and the use of said polymeric additives as processing aids.

The flow characteristics of polymer melts have paramount significance for the design and operating conditions of industrial processing equipment, and may tremendously affect the overall properties of manufactured polymer articles. Polymer melts typically exhibit a non-Newtonian behaviour; i.e. their apparent viscosity is strongly dependent on the shear rate applied when processing polymers at temperatures well above their melting points. High shear rates result typically from high levels of mechanical energy (pressure and shear) applied for the purpose of extruding, feeding or any sort of trans-porting polymer melts in the course of the shape-giving process. Furthermore, high shear rates may equally result from high flow rates or high flow velocities when polymer melts are forced to pass through narrow dies, nozzles, cylinder profiles and the like, which can be of round, rectangular, annular, slit-like, or any other irregular shape or low gap-width cross sections.

If inadequate attention is paid to the peculiar rheological properties of polymer melts, this may eventually lead to several negative, and therefore undesired, consequences in the aesthetic or mechanical polymer properties, which are well known in extrusion processes, in particular in the manufacture of profiles, especially thin-walled profiles, cast or blown films. Various defects are commonly referred to as sharkskin, snake-skin or orange-peel. These terms are figurative and self-explanatory descriptions of melt fracture phenomena which become more and more apparent when high shear rates cause visible roughness or even cracks and crevices on the polymer surface, so that the optical and mechanical properties of the manufactured polymer article are heavily deteriorated. Such defects become dramatically pronounced during melt processing of polymers for the production of articles of low thickness, since the shear rate ("$\gamma$", measured in $sec^{-1}$) is, in the case of a slit-die, in first approximation, inversely proportional to the square of the gap-width (width or distance "d"), which the melt has to pass; i.e. $\gamma \sim 1/d^2$.

A particular case concerns polyolefins, among them linear polyethylene, such as linear low-density polyethylene (LLDPE), a widely applied commodity polymer but known for its difficult melt processability. Several polyolefins, especially LLDPE, are prone to melt fracture (MF) due to their relatively narrow molecular weight distribution and to the specific entanglement features of their polymeric chains. This results in high shear stresses at typical shear rates, and in steep shear rate gradients at the die. Furthermore, the demand for down-gauging of films has led to the use of lower melt index resins for improved mechanical properties (toughness, etc), and also resulted in narrower die gaps. A further factor is the permanent drive for higher throughput rates. In addition to that, the emergence of single site (metallocene) PE and PP with narrower molecular weight distribution has created an even greater melt fracture tendency.

Several options to reduce melt fracture or related imperfections on extruded polymers are well known in the art. For example, U.S. Pat. No. 3,125,547 teaches the use of small amounts of fluorine-based polymers to achieve smooth surfaces during melt processing at high extrusion speed. Several other documents, e.g. U.S. Pat. No. 3,222,314, U.S. Pat. No. 4,013,622, U.S. Pat. No. 4,540,538 and US-A-2005/0,070,644, describe the beneficial use of polyethylene glycols of different molecular weights, especially for the manufacture of polyethylene films. Improved processability of polyolefin melts is claimed therein, so that improved manufacturing conditions and better quality of the finished products are stated.

Beyond the reduction of the required energy consumption for compounding at given throughput and temperature, and postponing of melt fracture (MF) to higher shear rates, polymer processing aids (PPA) can be efficient in lowering the presence of gels in the final product, especially for films, or diminishing die-build-up (or die drool) issues, or ease processibility during recycling.

While there is consensus that fluorine-based polymers incorporated into LLDPE improve the appearance of extrudates at high output rates and reduce the polymer melt viscosity, these products are also known for several shortcomings, such as the long onset time until such processing aids perform as expected (i.e. until MF is eliminated or its occurrence postponed to significantly higher shear rates, and/or until the energy consumption for compounding at a given throughput gets significantly reduced). Purging, removing or cleaning after processing such polymers containing fluorine-based polymers is very time consuming, i.e. when passing from one production run to another one.

In addition, such fluorine-based processing aids are often produced from the precursor perfluorooctaonic acid (PFOA) which appears to be very persistent in the environment and is suspected to be detrimental to the health.

Apart from fluorine-based polymer processing aids, the use of silicone-based polymers or of polyethylene glycol, waxes or various fatty acid esters, is also known in the art. Not only are the benefits of such products not always prominent, as the performance at given concentration can be inferior to fluorine-based polymer processing aids and because they may not display their efficiency on all equipments. Silicone-based polymers or those based on polyethylene glycol present further drawbacks such as the apparition of undesired streaks in the final product, for instance in films, the development of fumes, or plate out on calendring rolls.

The block and comb copolymers used according to the present invention do not exhibit the drawbacks of the aforementioned polymer processing aids. They are extremely useful for improving the melt flow characteristics of polymer melts, for lowering the energy consumption required for their processing, and for postponing the appearance of melt fracture to higher shear rates. They provide nearly immediate effect and are easily purged in case of change of production run. They are free of fluorine, do not develop fumes, and do not diffuse from the final articles or plate out on calendering rolls.

One aspect of the invention is a process for improving the flow properties of a melt containing a thermoplastic polymer, which comprises incorporating 0.005% to 0.5% by weight, relative to the weight of the thermoplastic polymer, of one or more comb or comb block copolymers which have been prepared in a first step a) by free radical polymerization of a $C_1$-$C_{10}$ alkyl ester of acrylic or methacrylic acid and optionally one or more monomers without an ester bond; and in a second step b) modified in a polymer analogous transesterification reaction with a primary or secondary alcohol to form a comb or comb block copolymer;

into said thermoplastic polymer prior to or during melt processing.

Preferred is a process wherein step a) is a controlled free radical polymerisation.

Examples of suitable thermoplastic polymers are:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (–Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylenepropylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially pvinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

For example the thermoplastic polymer is polypropylene, polyethylene, any polypropylene copolymer or any polyethylene copolymer or any of their blends.

Preferably the thermoplastic polymer is linear low density polyethylene (LLDPE).

The polymer processing aid of the instant invention is a comb or comb block copolymer which has been preferably prepared in a first step by controlled free radical polymerization (CFRP).

The combination of CFRP with subsequent post-modification of the block allows considerable widening of the scope of the possible products that can be used. With one CFRP-process step, a large row of different polymer materials already becomes available. Block and comb copolymers related to this invention and prepared in a two step reaction are, for example, described in WO 2006/0074969.

Controlled free radical polymerization using alkoxyamines or stable nitroxyl radicals is a well known technique and has been described extensively in the last twenty years.

For example U.S. Pat. No. 4,581,429 to Solomon et al., issued Apr. 8, 1986, discloses a free radical polymerization process which controls the growth of polymer chains to produce short chain or oligomeric homopolymers and copolymers. The process employs an initiator having the formula (In part) R'R"N—O—X, where X is a free radical species capable of polymerizing unsaturated monomers and the radical R'R"N—O. is terminating the growing oligomer/polymer.

U.S. Pat. No. 5,322,912 to Georges et al. issued Jun. 21, 1994 discloses a polymerization process using a free radical initiator, a polymerizable monomer compound and a stable free radical agent of the basic structure R'R"N—O. for the synthesis of homopolymers and block copolymers which are terminated by the nitroxyl radical.

More recently further nitroxyl radicals and nitroxyl ethers have been described. WO 98/13392 for example describes open chain alkoxyamine compounds, which have a symmetrical substitution pattern and are derived from NO gas or from nitroso compounds.

WO 96/24620 describes a polymerization process in which very specific stable free

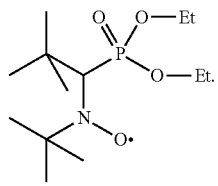

radical agents are used, such as for example

WO 98/30601 discloses specific nitroxyls based on imidazolidinones.

WO 98/44008 discloses specific nitroxyls based on morpholinones, piperazinones and piperazindiones.

These prior art nitroxyl radicals and nitroxyl ethers are all suitable for the instant invention.

The nitroxyl ethers and nitroxyl radicals suitable for the invention are principally known from U.S. Pat. No. 4,581,429 or EP-A-621 878. Particularly useful are the open chain compounds described in WO 98/13392, WO 99/03894 and WO 00/07981, the piperidine derivatives described in WO 99/67298, GB 2335190 and GB 2 361 235 or the heterocyclic compounds described in GB 2342649 and WO 96/24620. Recently further nitroxyl radicals and nitroxyl ethers have been described in WO 02/48205, WO02/48109 and WO 02/100831.

Also suitable are the compounds described by Hawker et al, Chem. Commun., 2001, 823-824

Some compounds are commercially available or can be prepared according to the aforementioned documents.

For example, the structural element of the alkoxyamine,

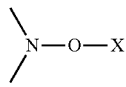

is a structural element of formula (I) and the structural element of the stable nitroxyl radical,

is a structural element of formula (II)

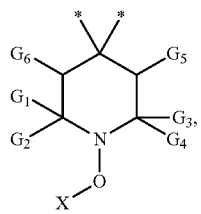
(I)

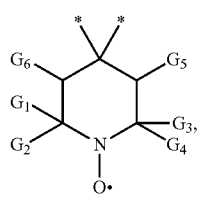
(II)

wherein
$G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;

$G_5$, $G_6$ independently are H, $C_1$-$C_{18}$alkyl, phenyl, naphthyl or a group COOC$_1$-$C_{18}$alkyl;

X is selected from the group consisting of —CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

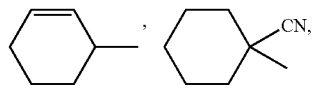

—CH$_2$CH=CH$_2$, CH$_3$CH—CH=CH$_2$ (C$_1$-C$_4$alkyl)CR$_{20}$—C(O)-phenyl, (C$_1$-C$_4$)alkyl-CR$_{20}$—C(O)—(C$_1$-C$_4$) alkoxy, (C$_1$-C$_4$)alkyl-CR$_{20}$—C(O)—(C$_1$-C$_4$)alkyl, (C$_1$-C$_4$) alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein R$_{20}$ is hydrogen or (C$_1$-C$_4$)alkyl and * denotes a valence.

In a very specific embodiment the alkoxyamine used for the controlled free radical polymerization is a compound of formula NOR01.

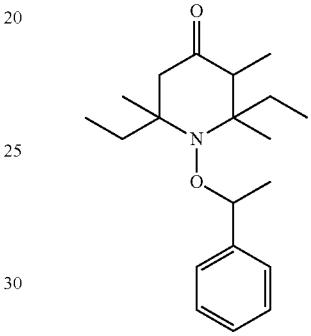
(NOR01)

Preferably the alkoxyamine compound is used in an amount from 0.01 mol-% to 30 mol-%, more preferably in an amount of from 0.1 mol-% to 20 mol-% and most preferred in an amount of from 0.1 mol-% to 10 mol-% based on the monomer.

Because CFRP is a "living" polymerization, it can be started and stopped practically at will. Furthermore, the polymer product retains the functional alkoxyamine group allowing a continuation of the polymerization in a living matter. Thus, once the first monomer is consumed in the initial polymerizing step a second monomer can then be added to form a second block on the growing polymer chain in a second polymerization step. Therefore it is possible to carry out additional polymerizations with the same or different monomer(s) to prepare multi-block copolymers.

Furthermore, since this is a radical polymerization, blocks can be prepared in essentially any order. One is not necessarily restricted to preparing block copolymers where the sequential polymerizing steps must flow from the least stabilized polymer intermediate to the most stabilized polymer intermediate, such as is the case in ionic polymerization. Thus it is possible to prepare a multi-block copolymer in which a polyacrylonitrile or a poly(meth)acrylate block is prepared first and then a styrene block is attached thereto.

Furthermore, there is no linking group required for joining the different blocks of the present block copolymer. One can simply add successive monomers to form successive blocks. The blocks might be seperated by a tapered zone, in which monomers of both the previous and continued block are present in different ratios.

A plurality of specifically designed polymers and copolymers are accessible, such as star and graft (co)polymers as described, inter alia, by C. J. Hawker in Angew. Chemie, 1995, 107, pages 1623-1627, dendrimers as described by K.

Matyaszewski et al. in Macromolecules 1996, Vol 29, No. 12, pages 4167-4171, graft (co)polymers as described by C. J. Hawker et al. in Macromol. Chem. Phys. 198, 155-166 (1997), random copolymers as described by C. J. Hawker in Macromolecules 1996, 29, 2686-2688, or diblock and triblock copolymers as described by N. A. Listigovers in Macromolecules 1996, 29, 8992-8993.

The comb or comb block copolymer is present in an amount of from 0.005% to 0.5%, preferably from 0.007 to 0.4% by weight, based on the weight of the thermoplastic polymer.

The comb or comb block copolymers of the present invention have a molecular weight between 1000 g/mol and 120000 g/mol, preferably between 2000 g/mol and 70000 g/mol. Copolymers with lower molecular weight than 2000 g/mol tend to lose their efficiency, whereas copolymers with higher molecular weight than 70000 g/mol tend to be too viscous to work as polymer processing aids in thermoplastic polymers.

The comb or comb block copolymers may be added directly to the extruder together with the thermoplastic polymer or they may be premixed with the thermoplastic polymer and then added to the extruder.

In order to enhance the PPA performance, a co-agent, or interfacial agent, can be incorporated in the composition. The role of the co-agent is, among others, the reduction of the onset time or induction time until the PPA effect is observable, or to further lower the melt viscosity or energy consumption required for compounding the polymer, or for enhanced processability. The interfacial agent or co-agent is a relatively low molecular weight ingredient which, for a particular system of PPA plus thermoplastic polymer, preferentially locates at the interface between these two polymers. The co-agent may be introduced to the mixture of PPA and polymer at any point up to and including the final melt shaping process. It is most desirable to combine the PPA and interfacial agent in a masterbatching step where both ingredients are present at high concentration (i.e. at a concentration greater than or equal to 0.5 wt. %, based on the total weight of masterbatch), so that the wetting of the PPA surface in the mixture occurs quickly.

Possible co-agents are, among others, thermoplastic polymers which are characterized by 1) being in the liquid state (or molten) at the extrusion temperature, 2) having a lower melt viscosity than both the melt processable polymer and the comb or comb block copolymer process aid, and 3) freely wets the surface of the comb or comb block copolymer particles in the extrudable composition. Examples of such co-agents include, but are not limited to i) silicone-polyether copolymers; ii) aliphatic polyesters such as poly (butylene adipate), poly (lactic acid) and polycaprolactone polyesters (preferably, the polyester is not a block copolymer of a dicarboxylic acid with a poly (oxyalkylene) polymer); iii) aromatic polyesters such as phthalic acid diisobutyl ester; iv) polyether polyols (preferably, not a polyalkylene oxide) such as poly (tetramethylene ether glycol); v) amine oxides such as octyldimethyl amine oxide; vi) carboxylic acids such as hydroxybutanedioic acid; vii) fatty acid esters such as sorbitan monolaurate and triglycerides; and vii) poly (oxyalkylene) polymers, including polyethylene glycols and their derivatives.

Preferred aliphatic co-agents are polyethylene glycol or aliphatic polyester (preferably polycaprolactone) having a number average molecular weight in the range 500 to 32000, preferably 1000 to 15000, and most preferably 2000 to 12000.

Further possible combinations are the ones comprising the comb or comb block copolymer related to the invention and a fluoroelastomer, preferably based on vinylidene fluoride and hexafluoropropylene.

Dry blend (preferably powder-powder) preparations including, but not limited to, the comb or comb block copolymer (PPA), a co-agent, a further additive such as, but not restricted to, antioxidant, UV absorber, light stabilizer, metal deactivator, peroxide scavenger, nucleating agent, filler, or reinforcing agent, or any combination thereof, a partitioning agent, preferably an inorganic partitioning agent, such as, but not restricted to, Calcium carbonate, Silicon oxide, talc or any combination thereof. The dry blend preparation can also include the thermoplastic polymer that is to be extruded (for example in fluff from the polymerization reactor or as grinded or precipitated powder) as component, or any other polymer that does not deleteriously affect the extrusion behaviour of the preparation with the thermoplastic polymer that is to be extruded, or combinations thereof.

These dry blends can be made by many processing methods including, but not limited to, admixing the components in pellet or powder form into the carrier polymer, or by encapsulating the PPA with a coating of the co-agent (especially polycaprolactone) or by side-feeding of the solid or molten mixture of PPA+co-agent into the molten carrier polymer.

For ease of processing, polymer processing aids (PPA) are often used in the form of a masterbatch, rather than neat, when they are added to the polymer. Within the scope of this invention, a masterbatch is a mixture of PPA in a carrier polymer. The carrier polymer can be the same polymer that is to be extruded, or it can be a second polymer that does not deleteriously affect the extrusion behaviour of the thermoplastic polymer that is to be extruded.

Masterbatches typically contain 0.5-50 wt. %, preferably 1-30 wt. % PPA, based on the total weight of the masterbatch. Masterbatches can be made, for example, by mixing the appropriate amount of PPA with carrier polymer in a mixer (e.g. Banbury mixer) or a co-rotating twin screw extruder, at a temperature above the melting point of the polymer.

Typically such a masterbatch contains a) the carrier polymer, b) 0.5 to 50 weight percent of the comb or comb block copolymer (PPA), and c) an effective amount of a co-agent to improve processability. It can also contain a further additive such as, but not restricted to, antioxidant, UV absorber, light stabilizer, metal deactivator, peroxide scavenger, nucleating agent, filler, or reinforcing agent, or any combination thereof. Furthermore, it can also contain a partitioning agent, preferably an inorganic partitioning agent, such as, but not restricted to, Calcium carbonate, Silicon oxide, talc or any combination thereof. The co-agent is most effective if the ratio of its concentration to the concentration of the PPA is not below 0.5:1 and not higher than 5:1.

For example the comb or block copolymer has a polydispersity, PD from 1.0 to 3.0, preferably from 1.0 to 2.5, and more preferably from 1.0 to 2.0.

For instance the comb or block copolymer has amphiphilic properties.

In a preferred embodiment of the invention, the comb or block copolymer has been prepared in step a) from n-butylacrylate and optionally from one or more monomers without an ester bond.

For example the monomer without an ester bond is selected from the group consisting of 4-vinyl-pyridine, 2-vinyl-pyridine, vinyl-imidazole, vinyl-pyrrolidone, dimethylacrylamide, 3-dimethylaminopropylmethacrylamide, styrene, α-methyl styrene, p-methyl styrene or p-tert-butyl-styrene and acrylonitrile.

When the controlled free radical polymerization is carried out with a nitroxyl radical an initiating radical source is additionally necessary. This radical source initiator is preferably an azo compound, a peroxide, perester or a hydroperoxide.

Specific preferred radical sources are 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dih yd rate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(tbutylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis(t-butylperoxy) butane, 2,2 bis(t-butylperoxy) propane, dicumyl peroxide, 2,5-dimethylhexane-2,5-di-tbutylperoxide, 3-t-butylperoxy 3-phenylphthalide, di-t-amyl peroxide, α,α'-bis(t-butylperoxy isopropyl)benzene, 3,5-bis(t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

The radical source is preferably present in an amount of from 0.01 mol-% to 30 mol-%, more preferred in an amount of from 0.1 mol-% to 20 mol-% and most preferred in an amount of from 0.5 mol-% to 10 mol-% based on the monomer.

The molar ratio of the radical source to the nitroxyl radical may be from 1:10 to 10:1, preferably from 1:5 to 5:1 and more preferably from 1:2 to 2:1.

The reaction conditions for the CFRP step a) are widely described in the documents listed above. In general the polymerization temperature is between 60 and 180° C. at normal pressure and the reaction time may vary from 30 minutes to 20 hours.

For example, the primary alcohol of step b) is an ethoxylate of formula (A)

wherein $R_A$ is saturated or unsaturated, linear or branched chain alkyl with 1-32 carbon atoms, or alkylaryl or dialkylaryl with up to 30 carbon atoms and n is 1 to 150;

a polydimethylsilicone oligomer of formula (B)

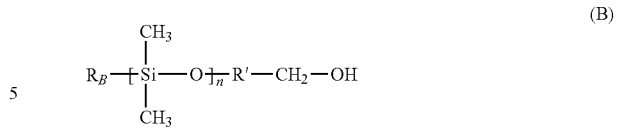

wherein $R_B$ is $C_1$-$C_{18}$alkyl, phenyl or $C_7$-$C_{15}$aralkyl; n is 1 to 50 and R' is a linking group with 1 to 20 carbon atoms;
a partly or fully fluorinated primary alcohol;
a $C_8$ to $C_{60}$alkyl linear or branched primary or secondary alcohol;
a racemic mixture of 2,2-dimethyl-4-hydroxymethyl-1,3-dioxolane;
a primary or secondary alcohol containing at least one tertiary amine group;
N,N,N'-Trimethylaminoethylethanolamin;
4-hydroxyethyl-pyridine and N-hydroxyethylmorpholine or
a primary alcohol whose chain is interrupted by at least one ester group such as polycaprolactone α-cetyloxy,-ω-hydroxy with a molecular weight from 750 to 2500 g/mol.

In the term alkylaryl, aryl means phenyl or naphthyl and alkyl is preferably $C_1$-$C_{20}$ linear or branched alkyl.

In a specific embodiment the alcohol is a partly or fully fluorinated primary alcohol. Examples of commercial fluorinated alcohol mixtures are: Zonyl BA®, Zonyl BA-L®, Zonyl BA-LD®, Zonyl BA-N® from Du Pont or fluorinated polyoxetane alcohols from Omnova Solutions Inc.

Preferably the primary alcohol of step b) is an ethoxylate of formula (A)

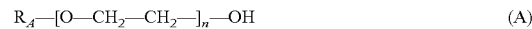

wherein $R_A$ is saturated or unsaturated, linear or branched chain alkyl with 1-32 carbon atoms and n is 1 to 150; a racemic mixture of 2,2-dimethyl-4-hydroxymethyl-1,3-dioxolane;
N,N,N'-trimethylaminoethylethanolamin;
N-hydroxyethylmorpholine or
polycaprolactone α-cetyloxy,-ω-hydroxy with a molecular weight from 750 to 2500 g/mol.

More preferably the primary alcohol of step b) is an ethoxylate of formula (A)

wherein $R_A$ is saturated or unsaturated, linear or branched chain alkyl with 5-22 carbon atoms and n is 20 to 100.

Typically the process is carried out at a temperature between 100° C. and 290° C.

The process according to the present invention is advantageous for any type of melt processing of thermoplastic polymers, where high shear conditions and high flow rates are applied for the manufacture of shaped articles. The process is in particular advantageous for extrusion methods, e.g. for the manufacture of profiles, especially thin-walled profiles, cast and blown films, profiles, sheets, wires and cables and the like.

Accordingly preferred processes are those being applied for the purpose of extrusion of a melt containing a thermoplastic polymer for the manufacture of profiles, especially thin-walled profiles, cast or blown films, sheets, wires or cables and those being applied for the purpose of preventing melt fracture, reducing energy consumption, limiting gel formation, or limiting die-build-up, during processing of a melt containing a thermoplastic polymer.

The polymer melt may optionally contain one or more conventional additives commonly used in the plastics' industry. Suitable examples are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-m ethylphenol, 1,1,3-tris(5-tert-butyl-4-hydroxy-2-methyl phenyl) butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxylethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]-octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxa mide, 3-thiaundecanol, 3-thiapentadecanol, trimethylhexanediol, trimethylolpropane, 4-hydroxymethyl-1-phospha-2,6,7-trioxabicyclo[2.2.2]-octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1,3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, Nallylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotri azole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenz oate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-pmethoxycinnamate, butyl α-cyano-β-methyl-p-methoxy-cinnamate, methyl α-carbomethoxy-p-methoxycinnamate, N-(βcarbomethoxy-β-cyanovinyl)-2-methylindoline, neopentyl tetra (α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidypexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxydisubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]-phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tertbutylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl phenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos 168, Ciba Specialty Chemicals Inc.), tris(nonylphenyl) phosphite,

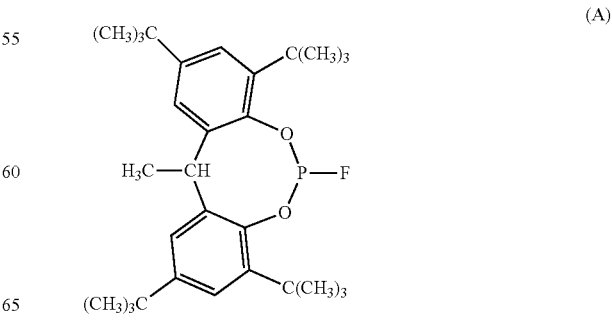

(A)

(B)

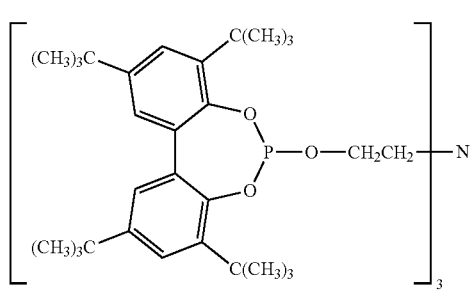

(C)

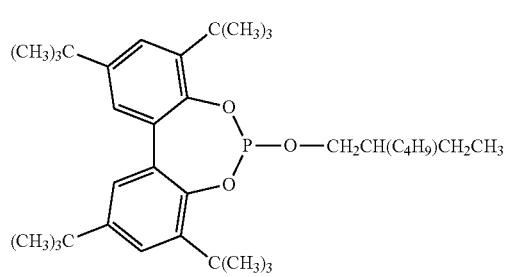

(D)

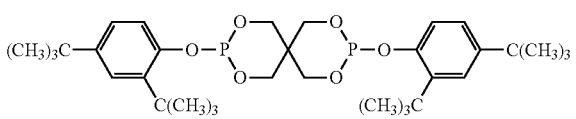

(E)

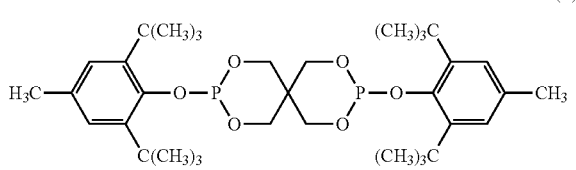

(F)

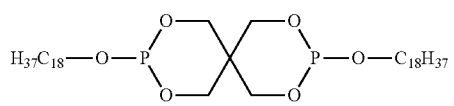

(G)

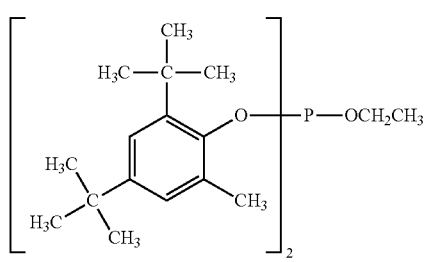

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxyla mine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-h eptylnitrone, N-lauryl-alpha-undecylnitrone, N-tetradecyl-alphatridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, anti-static agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The conventional additive is for example present in the polymer melt in an amount of 0.001 to 10% by weight, preferably 0.001 to 5% by weight, relative to the weight of the thermoplastic polymer. Conventional fillers or reinforcing agents may be present in the polymer melt in amounts of 0.1 to 10% by weight, preferably 1 to 5% by weight, in certain cases in amounts up to 70% by weight, relative to the weight of the thermoplastic polymer.

Further aspects of the invention are the use of a comb or block copolymer as defined above to improve the flow properties of a melt containing a thermoplastic polymer or as processing aid of a melt containing a thermoplastic polymer.

Also an aspect of the invention is an article obtainable by a process as defined above.

The definitions and preferences outlined above apply equally for all aspects of the invention.

The following examples illustrate the invention.

A) PREPARATION EXAMPLES

Abbreviations and Reagents

GPC: gel permeation chromatography
PS-Standard: polystyrene standards for GPC calibration
NMR: nuclear magnetic resonance
mbar: millibar absolute pressure
CFRP: controlled free radical polymerization
FRP: free radical polymerization
SC: solid content measurement by Halogen dryer Mettler Toledo (at 150° C., 0.5 g sample). (The result is obtained as weight %).
THF: tetrahydrofurane
MPA: 1-methoxy-2-propyl acetate
MeOH: methanol
EO: ethylene oxide
n-BA: n-butylacrylate
PD: polydispersity (the polydispersity of a sample is defined as weight average molecular weight Mw divided by Mn and gives an indication how narrow a distribution is)
4VP: 4-vinylpyridine
MPEG350 and 500: poly ethylene glycol monomethylether with Mn of 350 or 500 g/mol
NOR01: NOR Initiator/regulator, which is prepared according to GB 2335190.

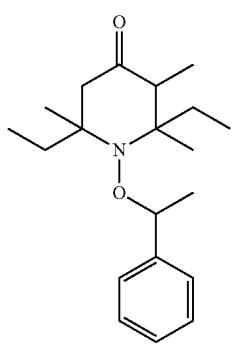

Example 1

Synthesis of a Linear Polymer Poly(nBA) by CFRP

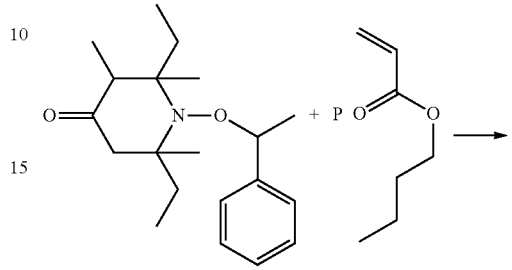

In a 3-necked 1000 ml round bottom flask with magnetic stirring bar, cooler, thermometer, dropping funnel 150.10 g n-Butylacrylate (nBA, 128.17 g/mol), 8.55 g compound NOR01 (317.48 g/mol) and 122.13 g of MPA were added, three times degassed with N2/vacuum and polymerized at 135° C. under N2 until a conversion of around 8 mol % is reached. 338.89 g of nBA is slowly added to the reaction with the dropping funnel and polymerized at 135° C. under N2 until a conversion of around 48 mol %. Residual monomers and solvents were distilled off at 80° C. and 12 mbar.

Yield 47%, GPC (THF, PS-Standard, Mn=7800 g/mol, PD=1.27), liquid.

According to analysis via $^1$H-NMR, the degree of polymerization is 75.

In analogous way as described for example 1, examples 2-4 are prepared with the compositions as indicated in Table 1.

TABLE 1

| Preparation of nBA polymers | | | | |
|---|---|---|---|---|
| Example | wt % O1 | wt % nBA | Mn | PD |
| 2 | 12.7 | 87.3 | 2455 | 1.2 |
| 3 | 6.6 | 93.4 | 3175 | 1.3 |
| 4 | 0.8 | 99.2 | 26100 | 1.5 |

Example 5

Synthesis of a Linear Polymer Poly(nBA) by FRP

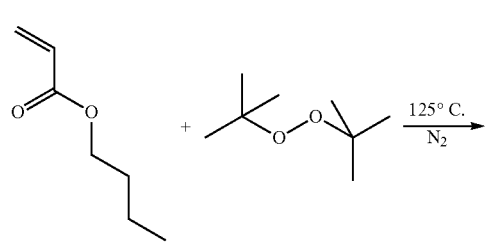

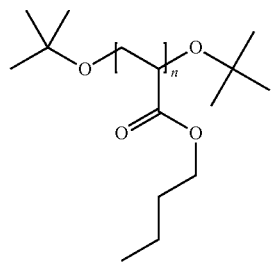

A 350 mL flask equipped with an overhead propeller stirrer, dropping funnel and distillation column with dry ice acetone cooling is charged with 88.3 g of xylene. A mixture of 0.7 g di-tert-butylperoxide in 87.7 g nBA is added slowly to the xylene at 125° C. over 135 min, after which the reaction mixture is stirred at 125° C. for 2 hr. SC=48.9% Mn=8403 g/mol, PD=2.6

Example 6 poly(nBA-block-4VP)

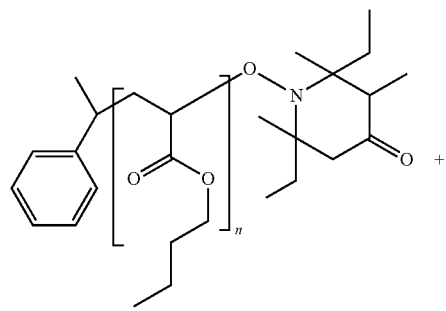

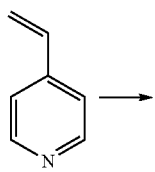

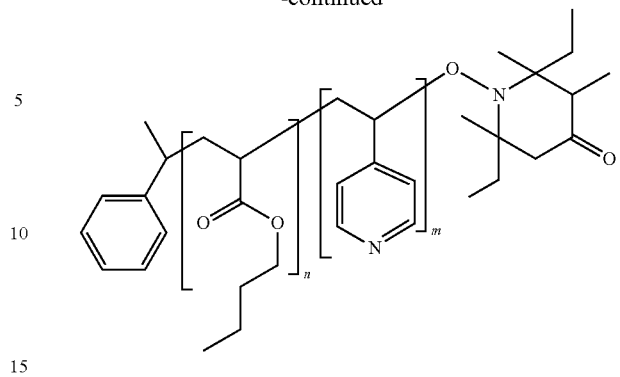

In a 3-necked 500 ml round bottom flask with magnetic stirring bar, cooler, thermometer 214.2 g poly(nBA) of example 1, 70.9 g 4-vinylpyridine and 79.7 g of MPA are added, 3 times degassed with N2/vacuum and polymerized at 125° C. under N2 for 8 hrs. Residual monomers and solvents are distilled off at 80° C. and 12 mbar.

Yield 85%, GPC (THF, PS-standard, Mn=8600 g/mol, PD=1.24), liquid

According to $^1$H-NMR, the degree of polymerization is: poly(nBA-block-4VP)=75-block-14

Example 7 poly(nBA-co-alkyl-(EO)n-H)

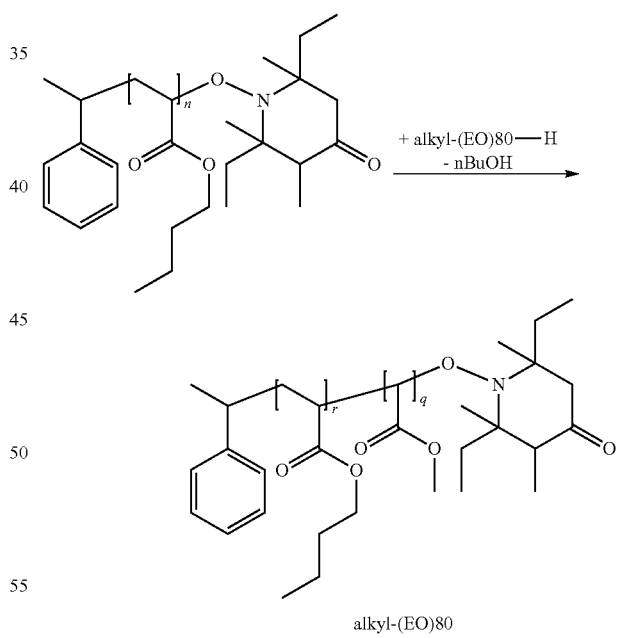

alkyl-(EO)80

In a 350 mL flask equipped with an overhead propeller stirrer, distillation column with dry ice acetone cooling 64.8 g of poly(n-BA) according to example 1 and 85.2 g of C16H31/C18H35-(EO)80-H are added. Three portions of 3 g of LiOMe (10% in MeOH) are added during 3.5 h at 130-135° C. The formed n-butanol is distilled off at reduced pressure (20 mbar).

146.4 g of poly(nBA-co-C16H31/C18H35-(EO)80-H) are obtained as a brown waxy solid. Mn=11466 g/mol, PD=2.2.

Analysis via GPC as well as 1H-NMR indicate almost quantitative conversion of the C16H31/C18H35-(EO)80-H. SC=98.3%.

Examples 8 to 13

In analogous way as described for example 7, examples 8-13 are prepared with the compositions as indicated in Table 2.

TABLE 2

Preparation of poly(nBA-co-R-(EO)n-H) comb copolymers

| Example | wt % B1 | wt % a | wt % b | wt % c | wt % d | Mn | PD |
|---|---|---|---|---|---|---|---|
| 8 | 25 | 75 | | | | 16737 | 2.8 |
| 9 | 47 | | 53 | | | 20605 | 1.3 |
| 10 | 30 | | 70 | | | | |
| 11 | 30 | | | 70 | | | |
| 12 | 18 | | | 82 | | 21525 | 1.1 |
| 13 | 10 | | | | 90 | | | a: C16H31/C18H35-(EO)80-H
b: C30H61-(EO)40-H
c: C30H61-(EO)80-H
d: i-C13-(EO)80-H

Example 14 poly(nBA-co-ROH)

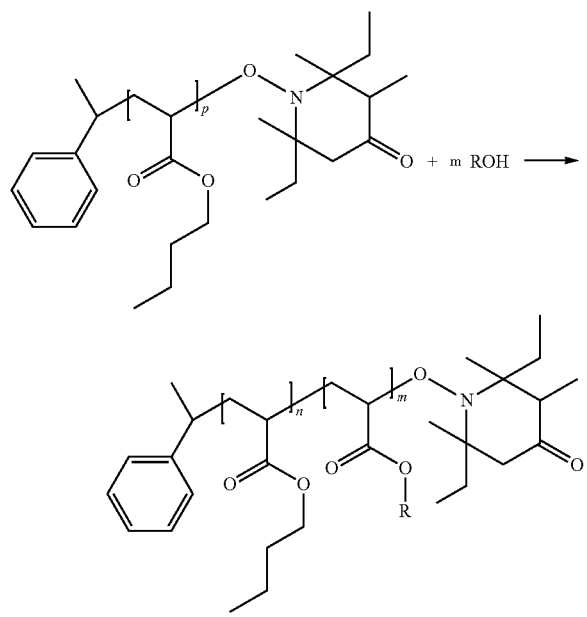

In a 350 mL flask equipped with an overhead propeller stirrer, distillation column with dry ice acetone cooling 80 g of poly(nBA) according to example 1 and 120 g of C16-C18 linear alcohol mix are added. Three portions of 4.3 g of LiOMe (10% in MeOH) are added during 5 h at 125-135° C. The formed n-butanol is distilled off at reduced pressure (20 mbar).

139.2 g of poly(nBA-co-ROH) are obtained as a brown highly viscous material. Mn=12831 g/mol, PD=1.6. Analyses via GPC as well as $^1$H-NMR indicate almost quantitative conversion of the alcohols. SC=98.5%.

Examples 15 to 19

In analogous way as described for example 14, examples 15-19 are prepared with the compositions as indicated in Table 3.

TABLE 3

Preparation of poly(nBA-co-ROH) comb copolymers

| Example | wt % B1 | wt % C16-C18 linear alcohol mix | wt % MPEG 500 | Mn | PD |
|---|---|---|---|---|---|
| 15 | 40 | 48 | 12 | 12310 | 1.6 |
| 16 | 40 | 36 | 24 | 11269 | 1.7 |
| 17 | 40 | 24 | 36 | 11145 | 1.7 |
| 18 | 40 | 12 | 48 | 10355 | 1.7 |
| 19 | 40 | — | 60 | 9699 | 1.7 |

Example 20 poly(nBA-co-MPEG350-co-R(EO)n)

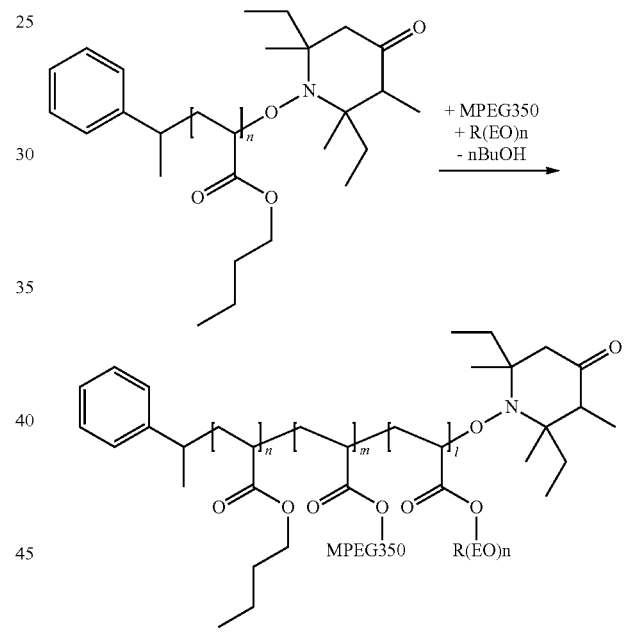

In a 600 mL flask equipped with an overhead propeller stirrer, distillation column with dry ice acetone cooling 67.5 g of poly(n-BA) according to example 1, 33.8 g MPEG350 and 315 g of i-C13-(EO)80-H are added. 4.5 g LiOtBu is dissolved in 33.7 g MPEG350. Four portions of 1.1 g of LiOtBu in 8.4 g MPEG350 are added during 4 h at 130-135° C. The formed n-butanol is distilled off at reduced pressure (20 mbar).

421.5 g of poly(nBA-co-MPEG350-co-R(EO)n) are obtained as a brown waxy solid. Mn=18417 g/mol, PD=1.2. Analyses via GPC as well as $^1$H-NMR indicate almost quantitative conversion of i-C13-(EO)80-H and MPEG350. SC=98.2%

Examples 21 to 25

In analogous way as described for example 20, examples 21-25 are prepared with the compositions as indicated in Table 4.

TABLE 4

Preparation of poly(nBA-co-MPEG350-co-R(EO)n) comb copolymers

| Example | wt % pol | wt % MPEG350 | wt % a | wt % b | wt % c | wt % d | Mn | PD |
|---|---|---|---|---|---|---|---|---|
| 21 | 15% B1 | 10 | 75 | | | | 23955 | 1.4 |
| 22 | 15% B1 | 15 | | 70 | | | 13226 | 1.3 |
| 23 | 15% B2 | 10 | | 75 | | | 19077 | 1.3 |
| 24 | 14% B3 | 15 | | | 71 | | 11521 | 2.6 |
| 25 | 14% B3 | 15 | | | | 71 | 6673 | 4.1 | a: 2,4,6-Tri-(1-phenylethyl)-phenol polyglycol ether with approx. 54 EO
b: i-C13-(EO)40-H
c: C16H33/C18H35-(EO)80-H
d: C16H33/C18H35-(EO)31-H

Examples 26 to 28 poly(nBA-co-MPEG500-co-R(EO)n)

In analogous way as described for example 20, examples 26-28 are prepared with the compositions as indicated in Table 5.

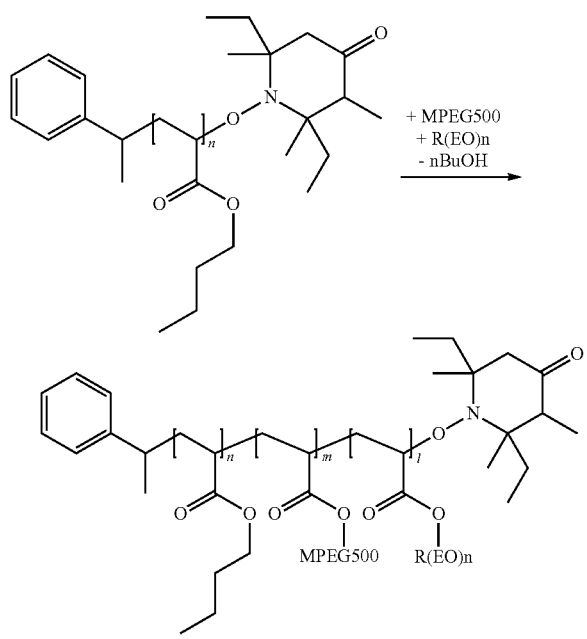

TABLE 5

Preparation of comb copolymers containing MPEG500 and R(EO)n

| Example | wt % pol | wt % MPEG500 | wt % a | wt % b | Mn | PD |
|---|---|---|---|---|---|---|
| 26 | 25% B1 | 25 | 50 | | 12490 | 2.4 |
| 27 | 15% B2 | 15 | | 70 | 15028 | 1.1 |
| 28 | 15% B4 | 15 | | 75 | | | a: C16H33/C18H35-(EO)80-H
b: i-C13-(EO)80-H

Example 29 poly(nBA-co-ROH-block-4VP)

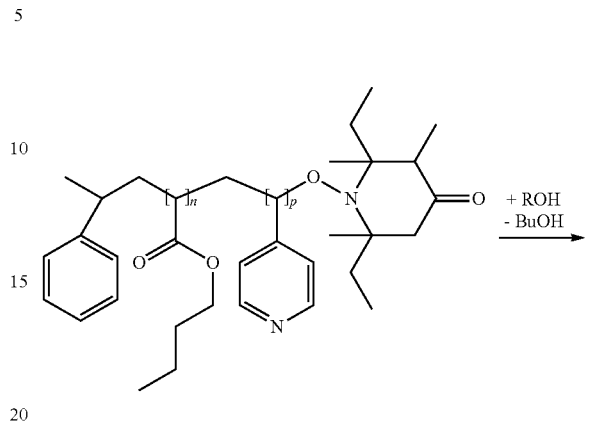

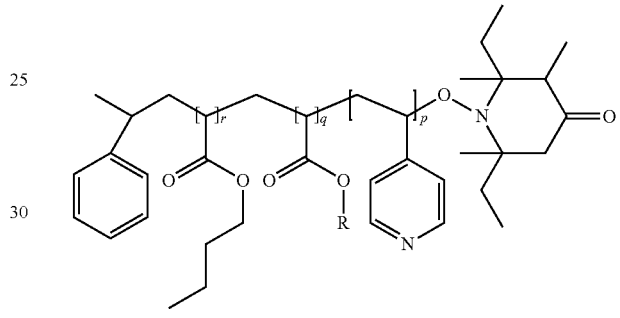

In a 200 mL flask equipped with an overhead propeller stirrer, distillation column with dry ice acetone cooling was charged 66.6 g of example 6 (60 wt % in MPA) and 63.1 g of C18-C22 linear alcohol mix. The mixture was heated to 110° C. under gentle vacuum to distill off the MPA. Three times 0.28 g of tetraisopropyl orthotitanate catalyst were added to the reaction mixture over 6 hrs at temperatures between 125 and 145° C. under vacuum. The reaction was confirmed by distillation of n-butanol. 81.5 g of a brown solid polymer was obtained (79%). NMR and GPC data confirmed almost quantitative conversion of the alcohol mix. Mn=17984, PD=1.3

In analogous way as described for example 29, examples 30 and 31 are prepared with the compositions as indicated in Table 6.

TABLE 6

Preparation of block copolymers poly(nBA-co-ROH-block-4VP)

| Example | wt % B6 | wt % C12-C15 alcohol mixture | wt % C25H51-OH | wt % C30H61-OH | Mn | PD |
|---|---|---|---|---|---|---|
| 30 | 40 | 20 | 40 | | 17526 | 1.5 |
| 31 | 40 | 20 | | 40 | 19328 | 1.5 |

Example 32 poly(nBA-co-i-C13-(EO)80-H)

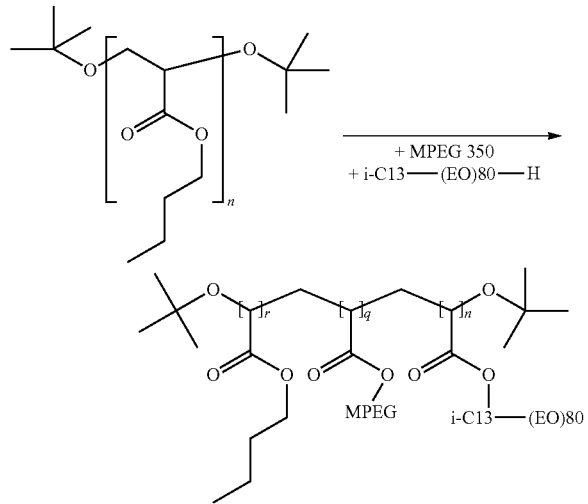

In a 100 mL flask equipped with an overhead propeller stirrer, distillation column with dry ice acetone cooling 10.2 g of poly(n-BA) according to example 5, 5.0 g MPEG350 and 23.3 g of i-C13-(EO)80-H are added. The temperature was increased to 135° C. Two times 0.11 g of LiOtBu are added during 2 hr, after which the reaction mixture is allowed to stir for 3 more hr at 135° C. under vacuum.

27.2 g of poly(nBA-co-i-C13-(EO)80-H) are obtained as a slightly yellow solid. Mn=11466 g/mol, PD=2.2. Analyses via GPC as well as $^1$H-NMR indicate almost quantitative conversion of i-C13-(EO)80-H and MPEG350.

B) APPLICATION EXAMPLES

General

The LLDPE grade used for the examples is, unless otherwise stated, the LLDPE blown film grade LL 1201 XV from ExxonMobil Chemical with melt flow index 0.7 g/10 min at 190° C./2.16 kg and density of 925 kg/m3.

The recipes mentioned in the below examples always contain a base stabilization of 1500 ppm Irganox B900 from BASF SE.

Example B1

The additives in powder form are added to the LLDPE matrix. The products are compounded during five minutes at constant screw rotating speed (50 rpm) under Nitrogen blanket in a lab scale twin-screw mini-extruder. The melt temperature is 210° C. After five minutes the compounding force is measured, and the by-pass of the twin-screw mini-extruder opened to let the polymer melt flow through a cylindrical die at various fixed forces from 1400 N to 2600 N. The respective forces are related to increasing shear rates.

The compounding force recorded after five minutes is measured once with the blank product, and once with the compounds (same substrate, with additive). The compounding force difference between blank product and compound is given in percentage. This difference gives account of the reduction of compounding energy provided by the polymer processing aid (PPA) under these conditions.

The visual quality of the extrudates obtained is assessed by microscopic pictures. The onset of melt fracture (i.e. the force at which the melt fracture appears, in this case visible in the form of surface roughness) is visually evaluated; the difference between the onset of the blank product (occurring at 2200 N) and of the compound gives an indication on the efficiency of the PPA additive in terms of postponement of melt fracture occurrence to higher shear rates.

The reference product in the below Table 1 is a commercial fluoroelastomer (Dynamar™ FX5920 A from company Dyneon) based on vinylidene fluoride & hexafluoropropylene copolymer+polyethylene glycol. The results are presented in Table B1.

The comparative product 1 is the alcohol C16H31/C18H35-(EO)80-H.
The comparative product 2 is the alcohol C16H33/C18H35-(EO)80-H.
The comparative product 3 is the alcohol i-C13-(EO)40-H.
The comparative product 4 is the alcohol i-C13-(EO)80-H.

TABLE B1

| Product from example | Concentration (ppm) | Reduction of compounding force (%) | Extrudate visual quality (force [N] at which melt fracture onset is visible) |
|---|---|---|---|
| 8 | 1500 | −16.7 | 400 N higher than blank |
| 26 | 1500 | −15.7 | Min > 400 N higher than blank |
| 21 | 1500 | −18.0 | Min > 400 N higher than blank |
| 22 | 1500 | −19.1 | 400 N higher than blank |
| 24 | 1500 | −19.9 | 400 N higher than blank |
| 23 | 1500 | −13.5 | Min > 400 N higher than blank |
| 13 | 1500 | −18.9 | Min > 400 N higher than blank |
| 18 | 1500 | −15.0 | 400 N higher than blank |
| 19 | 1500 | −19.3 | Min > 400 N higher than blank |
| 20 | 1500 | −20.3 | Min > 400 N higher than blank |
| Ref Product | 1500 | −21.7 | 200 N higher than blank |
| Comp. Prod. 1 | 1500 | −3.3 | As blank |
| Comp. Prod. 2 | 1500 | −2.5 | Min > 400 N higher than blank |
| Comp. Prod. 3 | 1500 | −1.7 | As blank |
| Comp. Prod. 4 | 1500 | −2.9 | As blank |
| 1 | 1500 | −7.2 | As blank |

This table exhibits the prominent processing aid features of the products of this invention. In particular, the combination of compounding force reduction and of surface quality improvement (onset of melt fracture shifted to higher conpounding force) is favourable for the products of the invention. In addition to that, it is observed that the extruder is far easier to purge (in our case directly with the same LLDPE as the one used for the application examples, whereby quick return to the initial high pressure of the blank product is recorded) with the products related to the invention than with the Ref Product (in which case the pressure remains low, and where a specific commercial purging compound containing a high proportion of inorganic filler has to be used, then the screw are dismounted and separately sand-blasted, and the barrel carefully cleaned manually).

Example B2

In the case of dry-blend incorporation, the ingredients were pre-mixed on a high-speed Henschel mixer and the dry-blend fed into the twin-screw extruder (25 mm L/D30 co-rotating screws, cylindrical die). The melt temperature is 210° C. and the screw rotating speed is 120 rpm.

The masterbatches were prepared on a lab scale twin-screw mini-extruder (50 rpm, melt temperature 210° C., under Nitrogen blanket) and pelletized. The additive loading of the masterbatches is 3%. In a further step, the masterbatch (pellets) is mixed with LLDPE pellets in a tumble mixer and fed in the same twin-screw extruder as above (25 mm L/D30 co-rotating screws, cylindrical die) with the same parameters as for the corresponding dry-blend compounds.

In both cases, the amperage, pressure and throughput are the output parameters, with their corollary features amperage/throughput and pressure/throughput. The two latter are listed in Table B2 and Table B3.

TABLE B2

Results of extrusion runs obtained by dry blend incorporation

| Products added to Blank | Reduction of ratio Amperage/Throughput (%) |
|---|---|
| — (Blank) | 0.0 |
| 1500 ppm Prep. Example 20 | −15.8 |
| 1000 ppm PEG 8000 | |
| 1500 ppm Prep. Example 20 | −24.5 |
| 1000 ppm PEG 2000 | |
| 1500 ppm Prep. Example 13 | −16.3 |
| 1000 ppm PEG 8000 | |
| 1500 ppm Prep. Example 13 | −21.9 |
| 1000 ppm PEG 2000 | |
| 1500 ppm Ref product | −14.2 |

TABLE B3

Results of extrusion runs obtained by masterbatch incorporation

| Products added to Blank | Reduction of ratio Amperage/Throughput (%) | Reduction of ratio Pressure/Throughput (%) |
|---|---|---|
| Blank | 0.0 | 0.0 |
| 1500 ppm Prep. Example 20 | −16.7 | −3.6 |
| 1500 ppm Prep. Example 20 1000 ppm PEG 8000 | −29.6 | −7.7 |
| 1500 ppm Prep. Example 20 1000 ppm PEG 2000 | −24.6 | −5.5 |
| 1500 ppm Prep. Example 13 | −20.6 | −3.4 |
| 1500 ppm Prep. Example 13 1000 ppm PEG 8000 | −23.3 | −3.4 |
| 1500 ppm Prep. Example 13 1000 ppm PEG 2000 | −16.0 | 1.1 |
| 1500 ppm Ref product | −12.7 | 0.8 |

Example B3

The powder additives were added to molten LLDPE in the chamber of a Brabender kneader. The temperature was 200° C. The kneader worked under Nitrogen blanket. The mixing duration was 10 minutes. The torque is recorded over the whole duration. The maximal torque and the torque at the end of the compounding process are given in the following Table B4.

TABLE B4

| Concentration of Prep. Example 20 (%) | Max torque (%) | Torque after 10 min (%) |
|---|---|---|
| 0 | 100.0 | 100.0 |
| 0.075 | 103.8 | 92.3 |
| 0.15 | 113.5 | 92.3 |
| 0.5 | 101.4 | 95.5 |
| 1 | 96.6 | 89.7 |
| 1.5 | 86.1 | 84.5 |
| 3 | 56.3 | 71.6 |

The Torque values are relative. 100% is the value of the blank.

100% max torque corresponds to 20.8 Nm.

100% torque after 10 minutes corresponds to 15.5 Nm.

Upon addition of the product of Preparation Example 20, the torque necessary for kneading the LLDPE material is strongly reduced.

Example B4

In order to evaluate the possible consequences of using a PPA in a polymer formulation, i.e. the possible influence on printability, surface treatment, etc, a series of tests with contact angle measurement (with water) is carried out. The products are extruded with PPA incorporation either in direct form (DB, i.e. powder-powder) or via a masterbatch preparation (MB, 3% concentration). Then, in a later step, the extruded pellets are blown film extruded (die diameter 6 mm, die gap 0.8 mm). The contact angle is measured on both surfaces of the film (noted up and down). The results are given in Table B5 and B6.

TABLE B5

| Product | Before aging | After aging 28 days at 60° C. in oven | Difference |
|---|---|---|---|
| | Side up | Side up | Side up |
| Blank LLDPE | 102.2 +− 1.2 | 102.9 +− 1.6 | −0.7 |
| 1500 ppm Prep. Example 20 (MB) | 103.7 +− 0.7 | 101.8 +− 0.9 | 1.9 |
| 1500 ppm Ref Prod (MB) | 102.5 +− 0.6 | 102.0 +− 1.3 | 0.5 |
| 1500 ppm Prep. Example 20 (DB) | 103.3 +− 0.8 | 101.5 +− 1.9 | 1.8 |
| 1500 ppm Ref Prod (DB) | 100.8 +− 1.2 | 103.6 +− 1.0 | −2.8 |

TABLE B6

| Product | Before aging | After aging 28 days at 60° C. in oven | Difference |
|---|---|---|---|
| | Side down | Side down | Side down |
| Blank LLDPE | 98.0 +− 1.5 | 104.4 +− 2.0 | −6.4 |
| 1500 ppm Prep. Example 20 (MB) | 104.1 +− 1.1 | 102.7 +− 0.7 | 1.4 |
| 1500 ppm Ref Prod (MB) | 103.9 +− 1.2 | 100.6 +− 0.5 | 3.3 |
| 1500 ppm Prep. Example 20 (DB) | 103.6 +− 1.3 | 102.8 +− 2.1 | 0.8 |
| 1500 ppm Ref Prod (DB) | 104.7 +− 1.2 | 103.9 +− 0.8 | 0.8 |

These results confirm that the product of Prep. Example 20 related to the present invention does not lead to contact angle difference larger than the ones measured on the blank LLDPE or on the compound containing the reference product. Therefore, one can conclude that no adverse effect on subsequent surface treatment should take place with the use of product of Prep. Example 20 as a PPA.

Example B5

The products were compounded on a twin-screw extruder (18 mm L/D40 co-rotating screws). The melt strength of the compounds was measured with a Rheotens equipment (Manufacturer Göttfert Prüfmaschinen GmbH). With this equipment, the polymer strand is extruded continuously and is taken up by two counter-rotating wheels. These wheels turn with a slowly increasing velocity and draw down the polymer strand. The resistance of the material against this drawdown is then measured by a force balance in the arm onto which the wheels are fixed. This results in an extension diagram "force F as a function of drawdown velocity v".

The temperature profile is 200/210/205/183° C. The acceleration of the pull-off wheels is 5 mm/s2.

In the below Table B7, F is the maximum force and Vb is the drawdown speed at break. The figures are averages of 5 measurements.

TABLE B7

| Product | F (cN) | Vb (mm/s) |
| --- | --- | --- |
| Blank | 10.3 | 367 |
| 1500 ppm Prep. Example 20 | 10.7 (3.9% improvement) | 435 (18.5% improvement) |

The presence of 1500 ppm of product of Preparation Example 20 in the LLDPE results in an increase of 18.5% of the melt strength. As melt strength is qualitatively related to the bubble stability during the blown film process, such an improvement in melt strength should lead to a more steady blown film process and possibly allow higher throughput or more constant blown film quality.

Example B6

The products were compounded and the properties measured as in Example 1. The reference product is in the below Table B8 is the same commercial fluoroelastomer (Dynamar™ FX5920A from company Dyneon) as in Example 1.

The polycaprolactone used in this example is a grade obtained commercially, in pelletform, with melt temperature of 66.9° C. (DSC measurement under Nitrogen, heating rate 10° C./min).

TABLE B8

| Product from Prep. example | Concentration (ppm) | Reduction of compounding force (%) | Extrudate visual quality (force [N] at which melt fracture onset is visible) |
| --- | --- | --- | --- |
| 20 | 1500 | −10.7 | 400 N higher than blank |
| Ref Product | 1500 | −16.5 | As blank |
| 20 + Ref Product | 750 + 750 | −18.0 | 400 N higher than blank |
| 20 | 3000 | −17.3 | Min > 400 N higher than blank |
| Ref product | 3000 | −20.8 | 400 N higher than blank |
| 20 + Ref product | 1500 + 1500 | −24.5 | 600 N higher than blank |

The results obtained in this example exhibit a synergy between the product related to the invention and the reference fluoroelastomer product, at least in terms of reduction of compounding force. Regarding the postponement of melt fracture onset to higher forces, the use of the product of the present invention, under the conditions of this test, results in smoother extrudates, i.e. onset of melt fracture at much higher forces.

In addition to that, as in Example 1, it is observed that the extruder is far easier to purge (in our case directly with the same LLDPE as the one used for the application examples, whereby quick return to the initial high pressure of the blank product is recorded) with the products related to the invention than with the reference products (in which case the pressure remains low, and where a specific commercial purging compound containing a high proportion of inorganic filler has to be used, then the screw is dismounted and separately sand-blasted, and the barrel carefully cleaned manually).

Example B7

A masterbatch is prepared by high shear melt processing in a twin screw extruder (corotating screws). The masterbatch consists of 3% (effective concentration) of the product from example 20+97% Dowlex 2045G (LLDPE from the Dow Chemical Company, melt flow index 1 g/10 min at 190° C. 2.16 kg, density 920 kg/m3). It is added at a concentration of 3% to a metallocene-LLDPE from ExxonMobil Chemica (melt flow index 1 g/10 min at 190° C. 2.16 kg, density 918 kg/m3) in an extrusion-blown film equipment (screw diameter 30 mm, die diameter 60 mm, die gap 0.4 mm). As reference the commercial masterbatch, Polybatch Film AMF-705 from A. Schulman, consisting of 5% fluoroelastomer-based PPA in a LLDPE carrier, is used. The extruder pressure is measured, and the quality of the blown film produced assessed visually.

TABLE B9

| Product | Pressure at 50 rpm (bar) | Pressure at 70 rpm (bar) | Pressure at 90 rpm (bar) | Visual aspect of the blown film |
| --- | --- | --- | --- | --- |
| mLLDPE | 331 | Not measured | Not measured | Melt fracture as of 50 rpm |
| mLLDPE + 3% masterbatch based on product from example 20 | 287 | 306 | 325 | No melt fracture even at 90 rpm |
| mLLDPE + 3% AMF-705 | 284 | 323 | 346 | No melt fracture even at 90 rpm | rpm = rotation per minute (rotation speed of the screw of the extruder)

The results presented in Table B9 show that a lower extrusion pressure is obtained with the masterbatch containing the PPA of the invention, than with the commercial masterbatch. Despite the lower effective concentration of the PPA in the masterbatch of the invention, the extruder pressure is lower than the one of the reference product, and the film is still smooth (no appearance of melt fracture). Therefore, beyond the increase in film surface quality, the film can be obtained at the same throughput with lower energy consumption or at higher throughput with the same energy consumption.

The invention claimed is:
1. A process for improving the flow properties of a melt containing a thermoplastic polymer, which comprises:
incorporating 0.005% to 0.5% by weight, relative to the weight of the thermoplastic polymer, of one or more comb or comb block copolymers into said thermoplastic polymer prior to or during melt processing and melt processing the resultant mixture, thereby postponing an appearance of melt fracture to higher shear rates, wherein the one or more comb or comb block copolymers are prepared in a first step, which comprises:
a) free radical polymerizing a $C_1$-$C_{10}$ alkyl ester of acrylic or methacrylic acid and optionally one or more monomers without an ester bond; and in a second step
b) modifying in a polymer analogous transesterification reaction with a primary or secondary alcohol to form the comb or comb block copolymer.

2. A process according to claim 1 wherein step a) is a controlled free radical polymerisation.

3. A process according to claim 1, wherein the thermoplastic polymer is polypropylene, polyethylene, any polypropylene copolymer or any polyethylene copolymer or any of their blends.

4. A process according to claim 3 wherein the thermoplastic polymer is linear low density polyethylene (LLDPE).

5. A process according to claim 1 wherein the comb or comb block copolymer has a polydispersity, PD from 1.0 to 3.0.

6. A process according to claim 1 wherein the comb or comb block copolymer has amphiphilic properties.

7. A process according to claim 1 wherein the comb or comb block copolymer has been prepared in step a) from n-butylacrylate and optionally from one or more monomers without an ester bond.

8. A process according to claim 1 which comprises incorporating one or more comb block copolymers where the monomers without an ester bond are selected from the group consisting of 4-vinyl-pyridine, 2-vinyl-pyridine, vinyl-imidazole, vinyl-pyrrolidone, dimethylacrylamide, 3-dimethylaminopropylmethacrylamide, styrene, α-methyl styrene, p-methyl styrene, p-tert-butyl-styrene and acrylonitrile.

9. A process according to claim 1 wherein the alcohol of step b) is an ethoxylate of formula (A)

$$R_A\text{—[O—CH}_2\text{—CH}_2\text{—]}_n\text{—OH} \quad (A)$$

wherein $R_A$ is saturated or unsaturated, linear or branched chain alkyl with 1-32 carbon atoms, or alkylaryl or dialkylaryl with up to 30 carbon atoms and n is 1 to 150;

a polydimethylsilicone oligomer of formula (B)

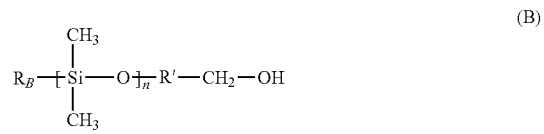

(B)

wherein $R_B$ is $C_1$-$C_{18}$alkyl, phenyl or $C_7$-$C_{15}$aralkyl; n is 1 to 50 and R' is a linking group with 1 to 20 carbon atoms;

a partly or fully fluorinated primary alcohol;

a $C_8$ to $C_{60}$alkyl linear or branched primary or secondary alcohol;

a racemic mixture of 2,2-dimethyl-4-hydroxymethyl-1,3-dioxolane;

a primary or secondary alcohol containing at least one tertiary amine group;

N,N,N'-Trimethylaminoethylethanolamin, 4-hydroxyethyl-pyridine, N-hydroxyethylmorpholine or polycaprolactone α-cetyloxy, ω-hydroxy with a molecular weight from 750 to 2500 g/mol.

10. A process according to claim 1, where the melt processing is carried out at a temperature between 100° C. and 290° C.

11. A process according to claim 1 further comprising the manufacture of thin-walled profiles, cast or blown films, sheets, wires or cables.

12. A process according to claim 1 for preventing melt fracture during melt processing.

13. A process according to claim 1 which comprises incorporating one or more comb copolymers.

14. A process according to claim 1 which comprises incorporating one or more comb block copolymers.

15. A process according to claim 1 which further comprises manufacturing an article.

16. An article obtained by a process as defined in claim 15.

* * * * *